US006668851B2

(12) United States Patent
Hunsberger et al.

(10) Patent No.: US 6,668,851 B2
(45) Date of Patent: Dec. 30, 2003

(54) FOOL-PROOF PLUG IN FLUID SYSTEM

(75) Inventors: Dale L. Hunsberger, Rockford, IL (US); Jack A. Price, Freeport, IL (US)

(73) Assignee: Suntec Industries Incorporated, Rockford, IL (US)

( * ) Notice: Subject to any disclaimer, the term of this patent is extended or adjusted under 35 U.S.C. 154(b) by 97 days.

(21) Appl. No.: 10/115,742

(22) Filed: Apr. 3, 2002

(65) Prior Publication Data

US 2003/0188718 A1 Oct. 9, 2003

(51) Int. Cl.[7] ............................ F17D 1/00; F16K 23/00
(52) U.S. Cl. .................................... 137/269; 137/315.01
(58) Field of Search .......................... 123/514; 137/269, 137/315.01

(56) References Cited

U.S. PATENT DOCUMENTS

| | | | |
|---|---|---|---|
| 3,559,680 A | 2/1971 | Norton | |
| 3,566,901 A | 3/1971 | Swedberg | |
| 3,575,296 A | 4/1971 | Peterson | |
| 3,613,715 A | * 10/1971 | Johnson | 137/269 |
| 3,666,048 A | * 5/1972 | Zajaczkowski | 137/269 |
| 3,935,108 A | 1/1976 | Forgues | |
| 4,169,386 A | 10/1979 | McMahan | |
| 4,490,105 A | 12/1984 | Hunsberger et al. | |
| 4,987,924 A | 1/1991 | Rush et al. | |
| 5,145,328 A | 9/1992 | Harwath | |
| 5,692,679 A | 12/1997 | Marran et al. | |
| 5,692,680 A | 12/1997 | Harwath et al. | |
| 5,709,917 A | 1/1998 | Carmien | |
| 5,919,033 A | 7/1999 | Singleterry et al. | |
| 5,924,539 A | 7/1999 | Braun et al. | |
| 5,931,192 A | 8/1999 | Smith et al. | |
| 6,286,550 B1 | 9/2001 | Yamaki et al. | |

OTHER PUBLICATIONS

U.S. patent application Ser. No. 10/017,153, Mitchell et al., filed Dec. 14, 2001.

* cited by examiner

*Primary Examiner*—Thomas N. Moulis
(74) *Attorney, Agent, or Firm*—Leydig, Voit & Mayer, Ltd.

(57) ABSTRACT

A plug for plugging a first port and blocking insertion of a second plug into a second port of a fluid system. The plug includes a threaded plug portion and a blocking stem portion extending from the threaded plug portion. The stem portion projects into the second port and blocks insertion or mounting of a second plug and thereby keeps the second port unplugged. In a disclosed embodiment, the plug is mounted into the return port of an oil pump unit of an oil burner to block bypassed flow from returning to the local reservoir of the oil pump unit. This prevents two plugs from being inadvertently mounted that could otherwise block all bypass flow in the pump unit and cause excess pressure build ups and blown seals.

14 Claims, 4 Drawing Sheets

FOOL-PROOF PLUG IN FLUID SYSTEM

FIELD OF THE INVENTION

The present invention relates generally to plugs, and more particularly relates to plugs for selectively plugging one of two different flow passages.

BACKGROUND OF THE INVENTION

Although there may be other applications of the present invention, the present invention is particularly useful in oil pump applications for oil burner units. Oil burner units have in the past been provided with regulating valves interposed between the nozzles or nozzle which discharge fuel into the combustion chamber and the fuel pump which supplies fuel oil to the nozzles. Generally, these regulating valves open upon delivery of a predetermined supply pressure from the pump, regulate a substantially constant pressure flow to the burner nozzles, and shut off the supply of fuel oil to the nozzles when the pump is turned off upon shut down. In addition to regulating the pressure of fuel oil delivered to the burner nozzles, these valves have a bypass function of diverting an excess portion of the fuel oil pressurized and delivered by the pump back to the tank or pump reservoir so that only a portion of the fuel oil supplied by the pump is delivered to the nozzles. Oil pump units having a regulator valve for use with oil burner units are well known in the industry, and are generally disclosed in U.S. Pat. No. 5,692,680 to Harwath, U.S. Pat. No. 5,145,328 to Harwath, U.S. Pat. No. 3,566,901 to Swedberg, and pending U.S. patent application Ser. No. 10/017,153 to Mitchell, et al., the entire disclosures of which are hereby incorporated by reference.

Whether bypassed fuel is recirculated to the fuel tank or the local tank reservoir depends upon how the pump is set up. In either event, the oil pump units have two port openings, including a first port opening to allow for return to the local pump reservoir and a second port opening to allow for return to tank. In practice, the service technician or installing mechanic will typically plug one of the port openings to provide the desired flow path. To allow for selective installation, oil pump units are often sold with two different plugs, one to fit each different port opening. On occasion, service technicians or installing mechanics will make the mistake of installing both plugs at the same time which in turn can cause significant problems such as increasing upstream oil pressure and pump seal blowouts.

BRIEF SUMMARY OF THE INVENTION

To overcome the problems existing in the art, the present invention is directed toward a plug for plugging a first port and blocking insertion of a second plug into a second port of a fluid system. The plug includes a threaded plug portion and a blocking stem portion extending from the threaded plug portion. The stem portion extends sufficiently from the threaded plug portion such that when the plug is mounted in the first port, the stem portion projects into the second port and blocks insertion or mounting of a second plug and thereby keeps the second port unplugged.

According to one aspect of the present invention, the plug is mounted into the return port of a oil pump unit for an oil burner to block return flow to the local reservoir of the pump (when bypassed flow is recirculated to the fuel storage tank). This prevents two plugs from being inadvertently mounted into the pump and blocking all return flow. The plug thus prevents excess upstream pressure build up and blown seals caused by improper installation of two plugs.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 2:
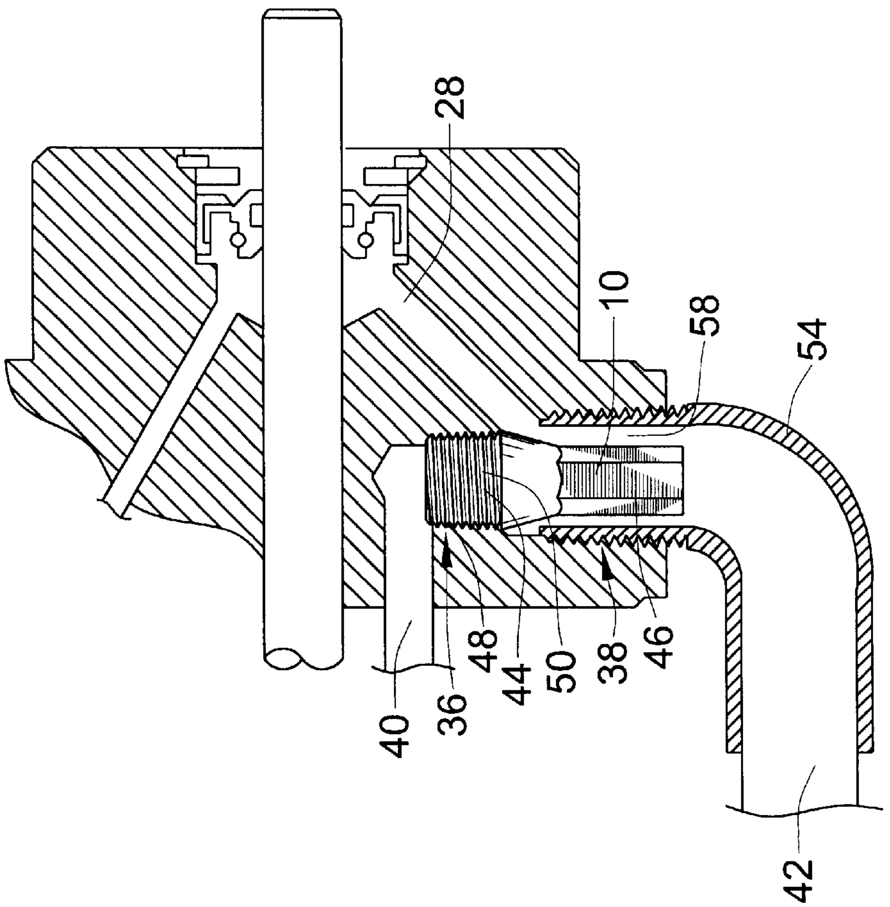
FIG. 2 is a similar cross section to FIG. 1, but illustrates how the plug of the preferred embodiment allows for installation of a conduit into the unplugged port over the blocking stem portion of the plug.
Figure 1:
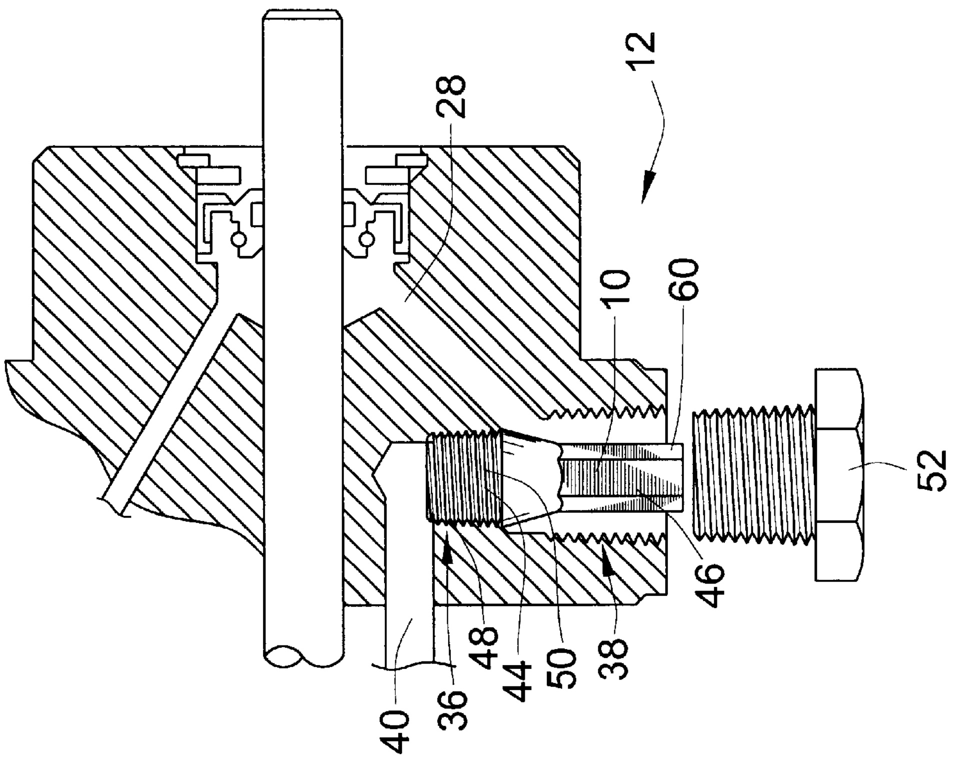
FIG. 1 is cross sectional view of a plug installed in a fluid system according to a preferred embodiment of the present invention, in which the plug blocks one port and prevents installation of a second plug into a second port.
Figure 3:
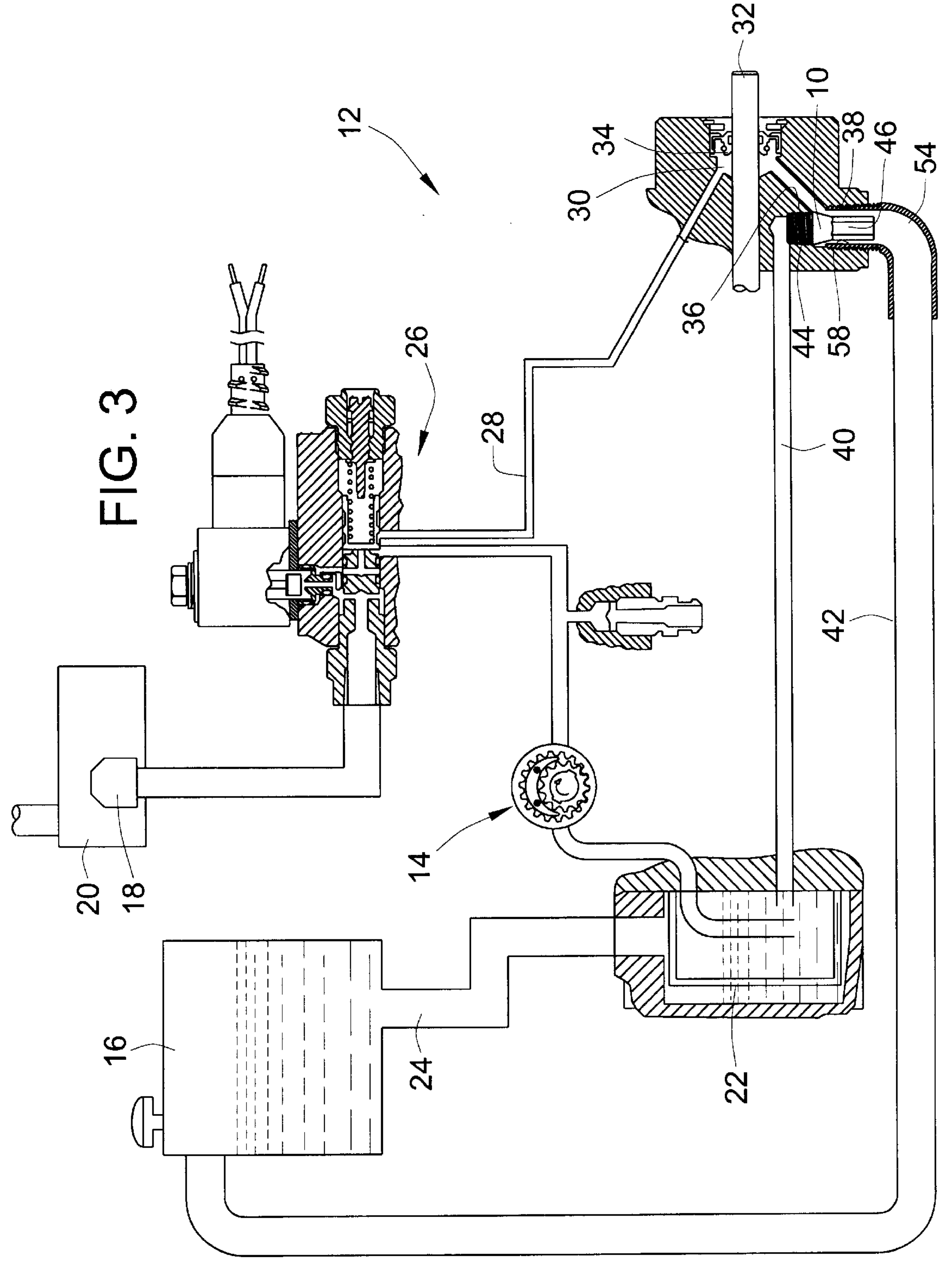
FIGS. 3 and 4 are schematic drawings of the plug shown in FIG. 1 incorporated in an oil pump unit according to two alternative hydraulic circuit arrangements.
Figure 4:
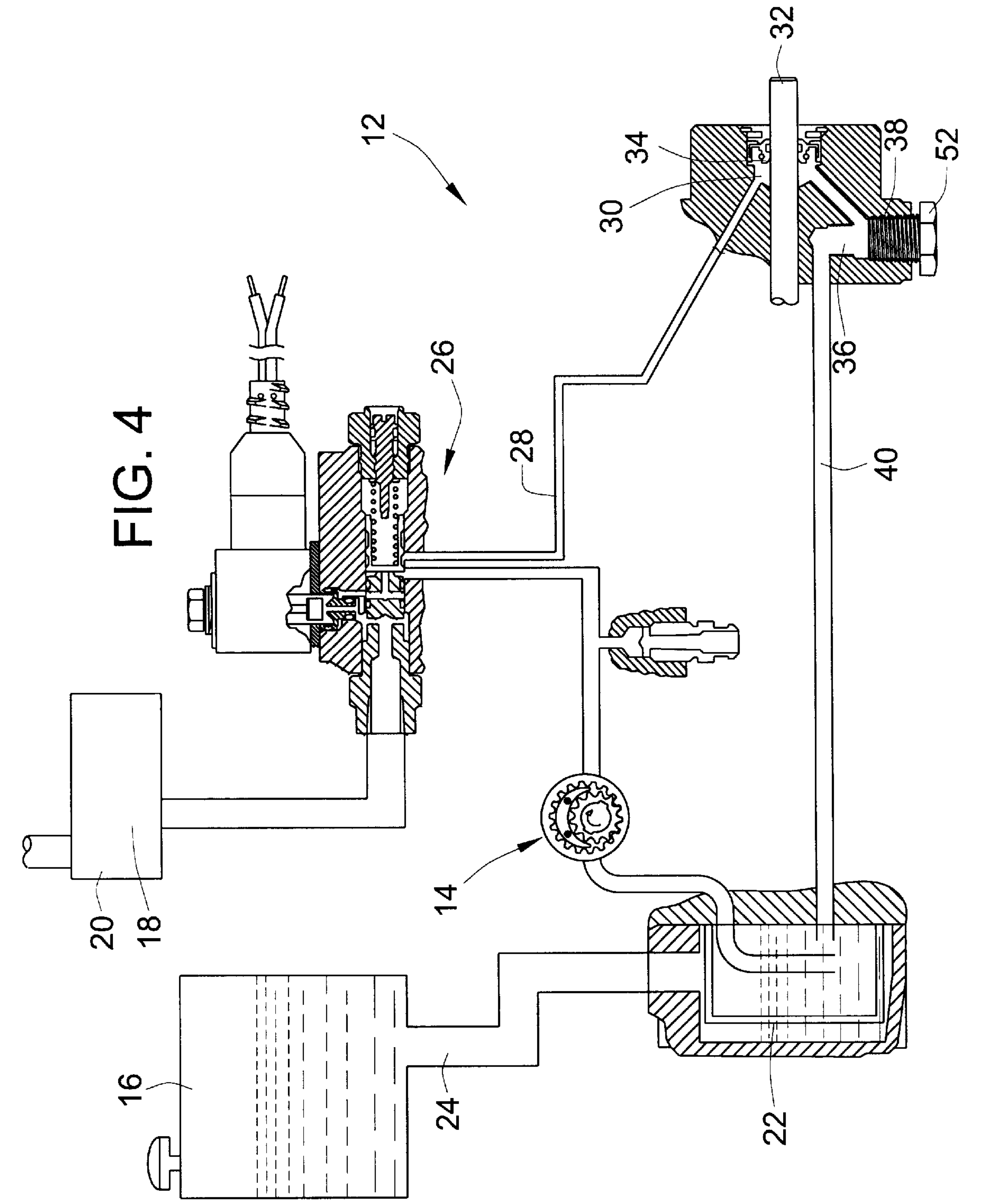
Figure 6:
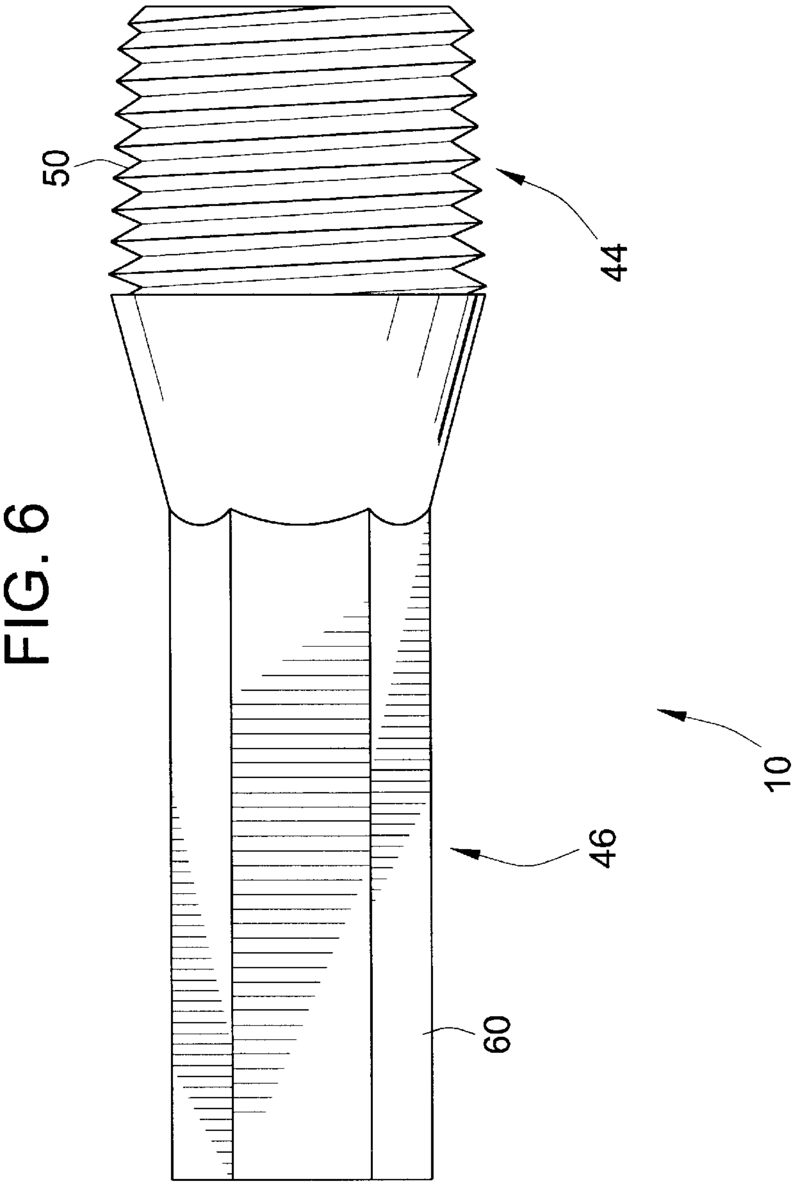
FIGS. 5 and 6 are side and end views of the plug illustrated in FIG. 1.
Figure 5:
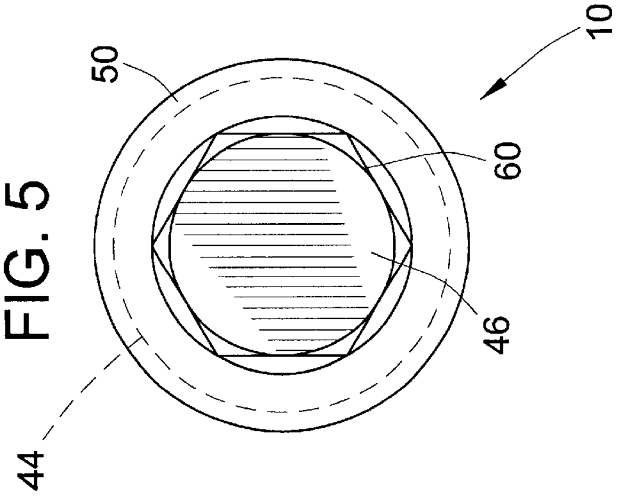

For purposes of reference, a preferred embodiment of the present invention has been depicted as a fool-proof plug 10 arranged in a fluid circuit shown herein as an oil burner circuit or pump circuit 12 in FIGS. 3 and 4. It will be understood that the plug 10 is particularly useful in the illustrated environment of the pump circuit 12. However, it will also be understood that the plug may be used in other applications or environments and certain broader claims appended hereto are meant to include-such alternative applications or environments.

Other than the aspects relating to the plug 10, the pump circuit 12 is conventional and includes a pump 14 for pumping fuel oil from a storage tank 16 to one or more nozzles 18 arranged in a combustion chamber 20 of an oil burner. Typically, the pump 14 has a local reservoir 22 that receives fuel through an inlet conduit 24 connected to the main storage tank 16. The pump also includes a fuel regulator 26 that is adapted to regulate flow of fuel oil from the pump 14 to the combustion chamber 20. The fuel regulator 26 recirculates or bypasses excess fuel flow delivered by the pump 14 through a bypass conduit 28. Typically, the bypass conduit 28 passes through a lubrication chamber 30 where the fuel oil can lubricate the rotating shaft 32 that drives the pump 14. The lubrication chamber 30 is sealed typically through a wiper seal 34. Further details of exemplary oil pumps and pump circuits can be had with reference to U.S. Patents and patent application referenced above.

The bypass conduit 28 can recirculate and return fuel oil either to the main storage tank 16 or to the local pump reservoir 22 through two different ports 36, 38. The smaller diameter port 36 is connected to a pump return passage 40 extending through the pump housing to the local pump reservoir 22. The larger port 38 can be connected through a tank return conduit 42 to the main fuel storage tank 16. In practice, one of the ports 36, 38 is plugged while the other remains unplugged to provide for return flow to either the storage tank 16 or alternatively to the local pump reservoir 22 as shown in FIGS. 3 and 4, respectively. As shown in FIGS. 1–4, the ports 36, 38 are coaxially aligned in spaced relation.

In accordance with the present invention, the plug 10 of the disclosed embodiment ensures that only one of the ports 36, 38 are closed. The plug 10 includes a threaded plug portion 44 and a stem portion 46. In the illustrated embodiment, the plug portion 44 threads into the threaded opening 48 of the smaller diameter port 46. The plug portion 44 plugs the smaller diameter port 36 leading to the pump return passage 40. The stem portion 44 also blocks insertion or mounting of a second plug 52 into the larger diameter port 38.

The stem portion 44 is of a small enough diameter or width so as not to block the larger diameter port 38. When the pump circuit shown in FIG. 3 is selected, a pipe fitting 54 is threaded into the threaded opening 56 of the larger diameter port 38 to establish the tank return conduit 42. Although the pipe fitting 54 surrounds the plug stem portion 44, the inner diameter of the pipe fitting 54 is sufficiently large and the outer diameter or width of the stem portion 44 is sufficiently small that an annular gap 58 between the stem portion 44 and the pipe fitting 54 exists to provide for return oil flow through the larger diameter port 38 and return conduit 42 leading to the storage tank 16.

The stem portion 44 of the plug 10 also may provide a tool engaging surface that can be engaged to a torquing tool (e.g. a screwdriver, allen wrench or hex wrench/socket). In the disclosed embodiment the tool engaging surface is an outer hexagonal surface 60 on the stem portion 44. The hexagonal surface 60 provides a means for receiving a tool to facilitate rotation and mounting of the plug 10 into the smaller diameter port 36.

Preferably, the threads 50 of the plug 10 (and the corresponding threads of the threaded opening 48) are of non standard threads (e.g. a 1/16–27 (PTF-7/8) thread characteristic) such that a mechanic will have a very difficult time finding a substitute off-the-shelf replacement plug to fit the hole. This better ensures that only the fool-proof plug 10 is used.

Although the disclosed embodiment has been illustrated as a plug 10 for plugging the smaller diameter port 36 and blocking insertion of the second plug 52 into the larger port 38, it will be understood that an embodiment may also be a plug for the larger port 38 that includes a stem projecting into and block the smaller port 36. With this type of an embodiment, the tool engaging surface (e.g. a hex socket for receiving an allen wrench or screw driver slot) would be on the plug portion rather than the extending stem portion.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fuel pump assembly adapted to be connected between a fuel tank and a combustion chamber of a burner for pumping fuel from the fuel tank to the combustion chamber, the fuel pump assembly comprising:

a local reservoir having an inlet for receiving fuel from the fuel tank;

a pump adapted to pump fuel from the local reservoir;

a fuel regulator adapted to regulate flow of fuel from the pump to the combustion chamber, the fuel regulator having a bypass conduit for recirculating fuel;

a first return port adapted to connect the bypass conduit to the local reservoir;

a second return port adapted to connect the bypass conduit to the fuel tank; and a plug mounted into and plugging one of the first and second return ports, the plug having an stem portion extending into a different one of the first and second return ports, the stem portion blocking mounting of a second plug into the a different one of the first and second return ports.

2. The fuel pump assembly of claim 1 wherein the first and second return ports comprise first and second threaded openings, respectively, wherein the plug includes threads threaded into the threaded opening of said one of the first and second return ports, and wherein the stem portion includes a tool engaging surface adapted to engage a torquing tool.

3. The fuel pump assembly of claim 2 wherein the tool engaging surface is an outer hexagonal peripheral surface on the stem.

4. The fuel pump assembly of claim 2 wherein the first return port is of a smaller diameter than the second threaded opening, wherein the plug is threaded into the first threaded opening of the first return port, further comprising a tank return conduit threaded into the second return port connecting the bypass conduit to the fuel tank, the stem portion extending into the return conduit, the return conduit being sized sufficiently larger than the stem portion such that a gap if formed therebetween and the stem portion does not block flow through the return conduit.

5. The fuel pump assembly of claim 4 further comprising means for preventing insertion of substitute plugs into the first return port, said preventing means comprising non-standard threads on the plug and the opening of the first return port.

6. A fluid system comprising:

a fluid conduit;

a pair of plugged and unplugged ports fluidically connected to the fluid conduit providing separate flow paths for fluid exiting the fluid conduit; and a first plug plugging the plugged port and blocking one of the flow paths, the plug blocking mounting of a second plug into the unplugged port.

7. The fluid system of claim 6 wherein the first plug includes threads threaded into the plugged port, wherein the ports are coaxially aligned, the first plug including a stem portion projecting into the unplugged port.

8. The fluid system of claim 7 wherein the stem portion includes a tool engaging surface adapted to engage a torquing tool.

9. The fluid system of claim 8 wherein the tool engaging surface is an outer hexagonal peripheral surface on the stem.

10. The fluid system of claim 7 wherein a second fluid conduit is fluidically connected to the unplugged port, the second fluid conduit surrounding the stem portion with a gap between the second fluid conduit and the stem portion keeping the unplugged port unplugged.

11. A plug for plugging a first port and blocking insertion of a second plug into a second port of a fluid system, the plug comprising:

a threaded plug portion; and a stem portion extending from the threaded plug portion, the stem portion extending sufficiently from the threaded plug portion such that when the plug is mounted in the first port, the stem portion projects into the second port and blocks insertion of the second plug.

12. The plug of claim 11 wherein the stem portion includes a tool engaging surface adapted to engage a torquing tool.

13. The plug of claim 12 wherein the tool engaging surface is an outer hexagonal peripheral surface on the stem portion.

14. The plug of claim 11 further comprising means for preventing insertion of substitute plugs into the first port, said preventing means comprising non-standard threads on the plug and the first return port.

* * * * *